United States Patent
Jones (10) Patent No.: US 8,245,039 B2
(45) Date of Patent: Aug. 14, 2012

(54) EXTENSIBLE AUTHENTICATION PROTOCOL AUTHENTICATION AND KEY AGREEMENT (EAP-AKA) OPTIMIZATION

(75) Inventor: D. Mark Jones, Ottawa (CA)

(73) Assignee: Bridgewater Systems Corp., Ottawa (CA)

( * ) Notice: Subject to any disclaimer, the term of this patent is extended or adjusted under 35 U.S.C. 154(b) by 1002 days.

(21) Appl. No.: 12/175,825

(22) Filed: Jul. 18, 2008

(65) Prior Publication Data

US 2010/0017603 A1    Jan. 21, 2010

(51) Int. Cl.
*H04L 9/32* (2006.01)
*H04M 3/16* (2006.01)

(52) U.S. Cl. .......... 713/168; 713/178; 455/411

(58) Field of Classification Search .......... 713/168, 713/171, 170, 178; 726/2, 3, 4; 455/410, 455/411
See application file for complete search history.

(56) References Cited

U.S. PATENT DOCUMENTS

| | | |
|---|---|---|
| 7,310,307 B1 | 12/2007 | Das et al. |
| 7,707,412 B2 * | 4/2010 | Nyberg et al. ............ 713/168 |
| 2003/0139180 A1 | 7/2003 | McIntosh et al. |
| 2004/0103282 A1 * | 5/2004 | Meier et al. ............ 713/171 |
| 2004/0193891 A1 * | 9/2004 | Ollila ............ 713/182 |
| 2005/0271209 A1 | 12/2005 | Sahasrabudhe et al. |
| 2006/0026670 A1 | 2/2006 | Potter et al. |
| 2006/0041939 A1 | 2/2006 | Schwartzman et al. |
| 2006/0288406 A1 | 12/2006 | Kuhn et al. |
| 2007/0094741 A1 | 4/2007 | Lynn et al. |
| 2007/0101406 A1 | 5/2007 | Zavalkovsky et al. |
| 2007/0249352 A1 | 10/2007 | Song et al. |
| 2007/0256120 A1 | 11/2007 | Shatzkamer et al. |
| 2008/0026724 A1 | 1/2008 | Zhang |
| 2008/0046732 A1 | 2/2008 | Fu et al. |
| 2008/0076425 A1 | 3/2008 | Khetawat et al. |
| 2008/0162927 A1 * | 7/2008 | Wang et al. ............ 713/155 |

FOREIGN PATENT DOCUMENTS

| | | |
|---|---|---|
| JP | 2006040225 | 2/2006 |
| WO | WO 2007/005309 A1 | 1/2007 |

OTHER PUBLICATIONS

J. Arkko and H. Haverinen, EAP AKA Authentication, , 2003. [online] Available: IETF draft-arkko-pppext-eap-aka-09.txt [retrieved from Citeseer database on Nov. 30, 2011].*

Sisheng Chen; Li Xu; Zhide Chen; "Secure Anonymous Routing in Trust and Clustered Wireless Ad Hoc Networks" This paper appears in: Communications and Networking in China, 2007. CHINACOM '07. Second International Conference on Issue Date : Aug. 22-24, 2007. pp. 994-998 [retrieved from IEEE database on Nov. 30, 2011].*

(Continued)

*Primary Examiner* — Zachary A Davis
*Assistant Examiner* — Lashanya Nash
(74) *Attorney, Agent, or Firm* — Zilka-Kotab, PC (57) ABSTRACT

Systems and methods are described for improved authentication of subscribers wishing to connect to a wireless network using the EAP-AKA protocol. Embodiments exploit the requirement that the client store and transmit the Pseudonym and Fast Re-authentication Identities upon request. By using the Fast Re-authentication Identity to store session state key information, the need for the AAA server to store and replicate the EAP-AKA key information for every session is eliminated.

16 Claims, 8 Drawing Sheets

OTHER PUBLICATIONS

Internet Engineering Task Force; RFC4187—Extensible Authentication Protocol Method for 3rd Generation Authentication and Key Agreement (EAP-AKA) (Jan. 2006).

Internet Engineering Task Force; RFC4284—Identify Selection Hints for the Extensible Authentication Protocol (EAP) (Jan. 2006).

English-language abstract for: Katsuyoshi, O., JP 2006040225 (listed on accompanying PTO/SB/08A as document FP2).

Bargh, M.S. et al., "UMTS-AKA and EAP-AKA Inter-working for Fast Handovers in All-IP Networks", Telematica Institut, Enschede, The Netherlands, IEEE Globecom Workshops (2007).

Trent, Clyde and Mellerup, Karl, "Software Design and Implementation of EAP support in a mobile platform & WLAN Security", Department of Information Technology Lund University (2006).

* cited by examiner

EXTENSIBLE AUTHENTICATION PROTOCOL AUTHENTICATION AND KEY AGREEMENT (EAP-AKA) OPTIMIZATION

BACKGROUND OF THE INVENTION

1. Field of the Invention

The present invention relates to communications, and more particularly to optimizing re-authentication in EAP-AKA.

2. Background of Invention

A wireless network generally includes many wireless nodes and users trying to gain access to a network. The primary means for controlling access include network access servers ("NAS") and authentication servers. A NAS provides access to the network. A primary authentication server, such as an authentication, authorization, accounting (AAA) server, provides centralized authentication services to a NAS for authenticating client devices before they are granted access to the network. In typical installations, the devices and users connect through the NAS to obtain access to a network (e.g., the Internet) via some form of wireless connection. The authentication server is typically a RADIUS (Remote Authentication Dial-In User Service) or Diameter server.

EAP-AKA (Extensible Authentication Protocol-Authentication and Key Agreement) is a protocol for authenticating subscribers using a USIM (Universal Mobile Telecommunications System (UMTS) Subscriber Identity Module) who wish to connect to a wireless network. EAP-AKA typically requires an AAA server to retrieve key material from a HLR/HSS (Home Location Register/Home Subscriber Server). Network operators are very sensitive to the additional load on the HLR/HSS as a result of this interaction. EAP-AKA employs a mechanism called Fast Re-authentication to eliminate the need to retrieve key material from the HLR/HSS on every subscriber authentication. Fast Re-authentication uses a temporary identifier issued by the AAA on every successful authentication. The temporary identifier is stored on the client device for presentation to the AAA server on the next authentication. Unfortunately, the Fast Re-authentication mechanism requires the AAA server to store session state information. A resilient implementation also requires this session state information to be replicated on backup AAA servers. Fast Re-authentication is described in depth in "RFC 4187: Extensible Authentication Protocol Method for 3rd Generation Authentication and Key Agreement (EAP-AKA)" by the Internet Engineering Task Force (IETF), the disclosure of which is hereby incorporated by reference.

What is needed are systems and methods that provide the benefits of the Fast Re-Authentication mechanism while providing greater flexibility and a lower overhead.

SUMMARY OF THE INVENTION

Embodiments of this invention propose using this Fast Re-authentication identifier as a session state store for key material. Such an approach eliminates the need for an AAA server to store and replicate the EAP-AKA key material for every session and so reduces cost.

Exemplary systems and methods provide for improved authentication of subscribers wishing to connect to a wireless network using the EAP-AKA protocol. Embodiments exploit the requirement that the client store and transmit the Pseudonym and Fast Re-authentication Identities upon request. By using the Fast Re-authentication Identity to store session state key information, the need for the AAA server to store and replicate the EAP-AKA key information for every session is eliminated.

The cryptographic algorithms presented in this disclosure require the use of a server-key that is known by all AAA servers within a given failover group. This server-key should be rotated at the same frequency as the Pseudonym Identity regeneration rate chosen by the network operator.

Persons skilled in the art will recognize that the fast re-authentication algorithms employed in EAP-SIM are sufficiently similar to those algorithms employed in EAP-AKA such that embodiments of the current invention directed towards EAP-SIM also fall within the scope of the current invention.

Further embodiments, features, and advantages of the invention, as well as the structure and operation of the various embodiments of the invention are described in detail below with reference to accompanying drawings.

BRIEF DESCRIPTION OF THE FIGURES

The present invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
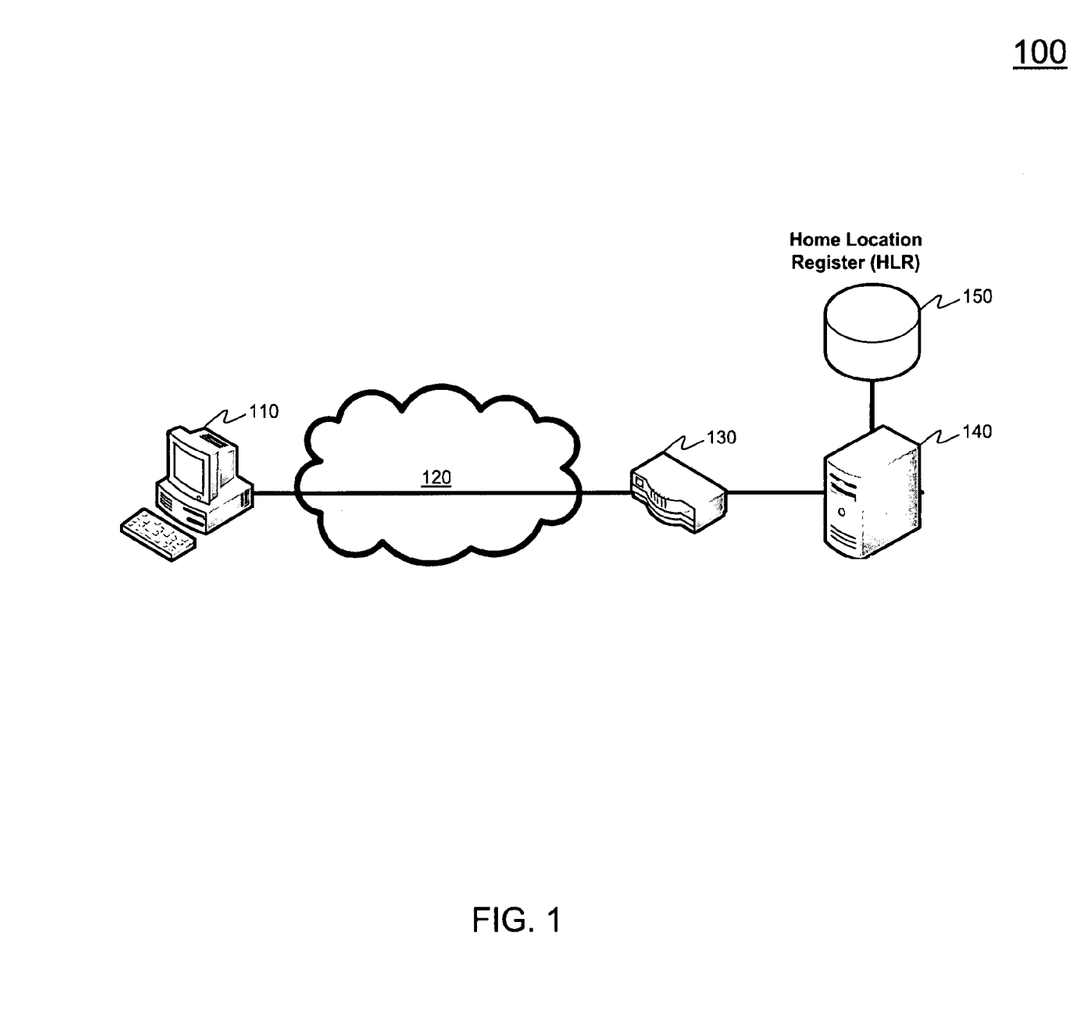
FIG. 1 provides a diagram of an architecture of an exemplary subscriber network.

FIG. 1 provides an architecture 100 of a subscriber network. Architecture 100 includes user equipment 110, access network 120, network access server (NAS) 130, AAA server 140, and home location register (HLR) 150. Architecture 100 provides a very simplified diagram of a subscriber network to illustrate the concepts of subscriber authentication. As will be known by individuals skilled in the relevant arts, the present invention can be used in any type of subscriber application in wireless or wireline networks, or networks combining both wireless and wireline network elements.

User equipment 110 is any device that provides a subscriber access to various networks. User equipment 110 can include, but is not limited to, a laptop computer, a cellular phone, a smart phone, a PDA, other wireless mobile devices, and wired network devices. Access network 120 represents networks that may require a subscriber of user equipment 110 to have a subscription before a subscriber is granted accessed.

Access network 120 can be a wire line or a wireless network. Network access server (NAS) 130 is the point of access for user equipment 110. AAA server 140 performs authentication, authorization and accounting functions. It should be noted that authentication, authorization and accounting functions can be split among two or more servers (e.g., an authentication/authorization server and an accounting server). Home Location Register (HLR) 150 stores subscriber credentials and profiles that are used by AAA server 140 to perform AAA functions.

Referring to FIG. 1, when user equipment 110 attaches to the access network 120, network access server 130 needs to authenticate with the AAA server 140 before network access is granted. The subscriber provides credentials to network access server 130. The network access server 130 forwards the credentials to AAA server 140. The credential validation may involve EAP (Extensible Authentication Protocol). The transport between network access server 130 and AAA server 140 is typically carried over AAA protocol using RADIUS or Diameter. The AAA messages may travel through a visited AAA server (not shown), zero or more broker AAA server(s) (not shown), before finally arriving at the AAA server 140. The accounting function can include a home location register 150 that stores subscriber credentials and profiles.

Figure 2:
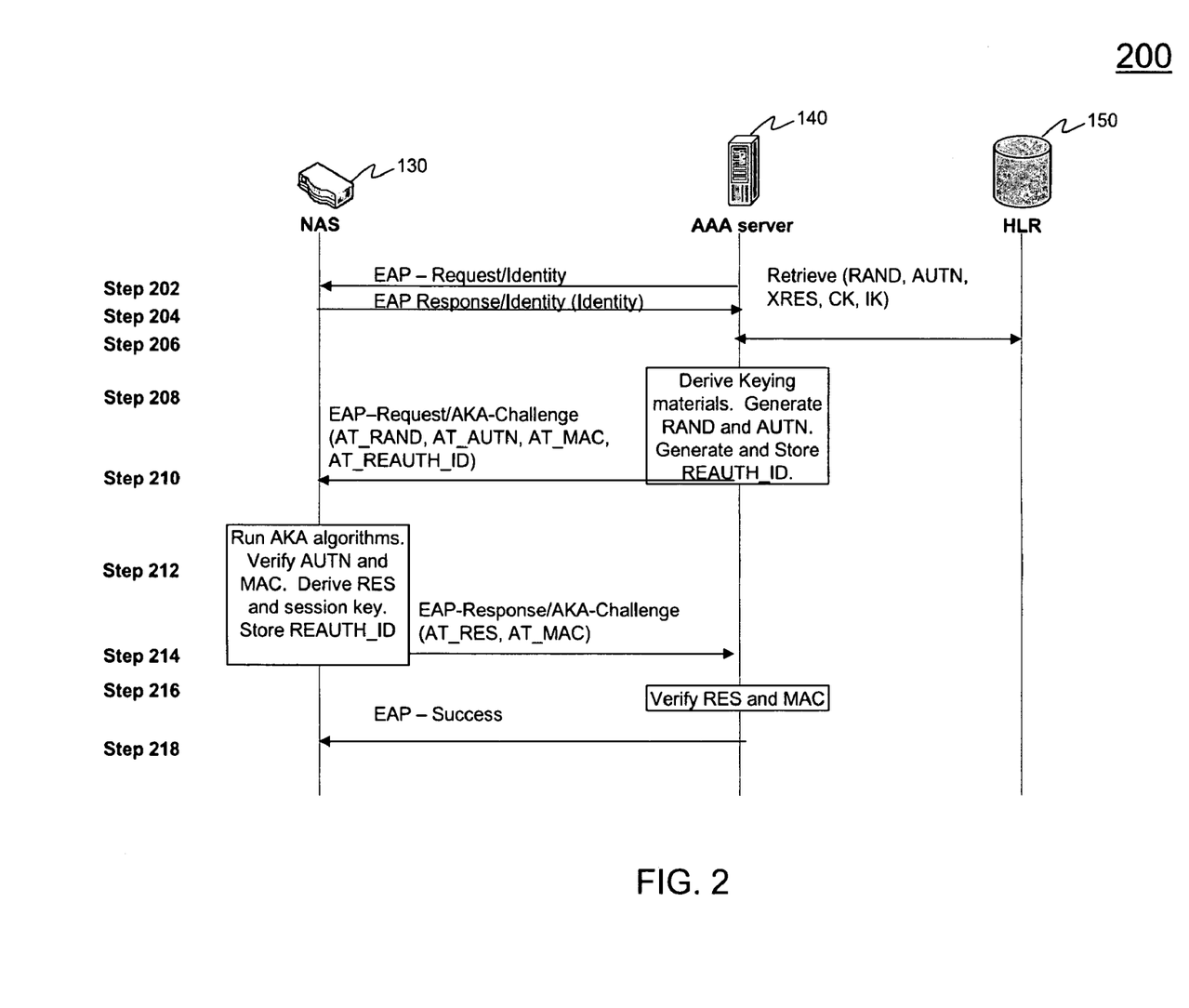
FIG. 2 illustrates a successful Full Authentication Exchange in EAP-AKA.

FIG. 2 provides a diagram of a successful full authentication exchange in EAP-AKA.

At step 202, AAA server 140 issues an EAP-Request-Identity message. The coding of the message can be similar to the encoding used in "RFC 4284: Identity Selection Hints for the Extensible Authentication Protocol (EAP)," by the IETF, the disclosure of which is hereby incorporated by reference and will be known to individuals skilled in the relevant arts based on the teachings herein and reference to RFC 4284.

At step 204, NAS 130 responds to the EAP-Request-Identity message. The identity response includes either the subscriber's International Mobile Subscriber Identity (IMSI), or a temporary pseudonym identity. This pseudonym identity can be used in subsequent full authentication requests in order to avoid sending the subscriber's permanent identity. When a temporary pseudonym identity is used, it is created by the AAA server 140 after a successful authentication based on the IMSI and returned to the subscriber. The pseudonym identity can be changed at any time by the AAA server on subsequent authentications.

At step 206, after obtaining the subscriber identity, the AAA server 140 retrieves the AKA quintets for use in authenticating the subscriber from the HLR 150 based on the presented permanent identity (IMSI) or a pseudonym identity. The AKA quintets include: RAND (a 128-bit random number generated by the HLR 150), XRES (an expected result part), CK (a 128-bit session key for encryption), IK (a 128-bit session key for integrity check), and AUTN (an authenticator part used for authenticating the network to the identity module). The vector may be obtained by contacting an Authentication Center (AuC) on the mobile network. For example, per UMTS (Universal Mobile Telecommunication System) specifications, several vectors may be obtained at a time. Vectors may be stored in the EAP server for use at a later time, but they may not be reused. In the CDMA2000 protocol, the vector may include a sixth value called the User Identity Module Authentication Key (UAK). This key is not used in EAP-AKA.

After a successful authentication based on the IMSI, the AAA server 140 may create a pseudonym identity and return it to the client. As noted above, this pseudonym identity can be used in subsequent full authentication requests in order to avoid sending the subscriber's permanent identity. Also, as noted above, the pseudonym identity can be changed at any time by the AAA server 140 on subsequent authentications. After a successful authentication based on the IMSI or pseudonym identity, the AAA server 140 may create a fast re-authentication identity and return it to the client.

At step 208, from the quintet, the AAA server 140 derives the keying material. Keying material includes a master key (MK) from which all other key material is derived. The master key is derived as follows: MK=SHA1 (Identity|CK|IK), wherein the "|" character denotes concatenation and where SHA1 is a hash function as described in the Secure Hash Standard. AAA server 140 may derive and store a fast re-authentication identity (REAUTH_ID) based on keying material for use in fast re-authentication.

At step 210, the AAA server 140 starts the actual AKA protocol by sending an EAP-Request/AKA-Challenge message. EAP-AKA packets encapsulate parameters in attributes, encoded in a Type, Length, Value format. The EAP-Request/AKA-Challenge message contains a random number (AT_RAND), a network authentication token (AT_AUTN), and a message authentication code (AT_MAC). The EAP-Request/AKA-Challenge message may optionally contain encrypted data, including REAUTH_ID which is used for fast re-authentication support.

At step 212, the NAS 130 runs the AKA algorithm (typically using an identity module) and verifies the AUTN.

At step 214, if the verification is successful, i.e., the NAS 130 is talking to a legitimate EAP server, the NAS 130 proceeds to send the EAP-Response/AKA-Challenge. This message contains a result parameter (AT_RES) that allows the AAA server 140, in turn, to authenticate the NAS 130, and the AT_MAC attribute to protect the integrity of the EAP message.

At step 216, the AAA server 140 verifies that the AT_RES and the AT_MAC in the EAP-Response/AKA-Challenge packet are correct.

At step 218, the AAA server 140 sends the EAP-Success packet, indicating that the authentication was successful.

Figure 3:
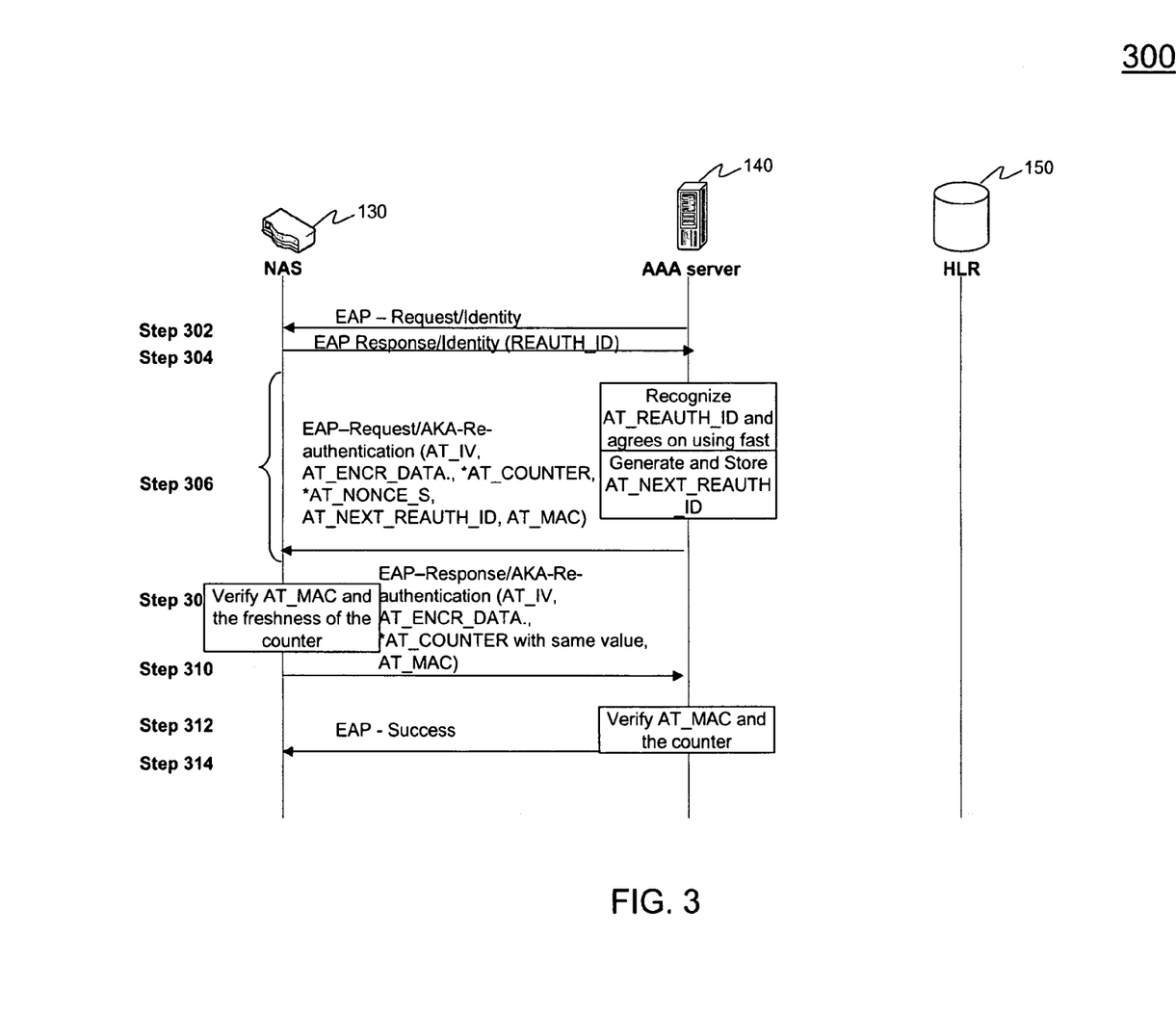
FIG. 3 illustrates a successful Fast Re-authentication Exchange in EAP-AKA.

FIG. 3 illustrates successful fast re-authentication exchange in EAP-AKA. Fast re-authentication is based on keys derived on full authentication, as described above with respect to FIG. 2. A new fast re-authentication identity must be generated on each successful authentication.

At step 302, the AAA server 140 issues an EAP-Request-Identity message.

At step 304, if the user equipment (UE) has maintained state information for re-authentication, the UE indicates this by using a specific fast re-authentication identity instead of the permanent identity (IMSI) or a pseudonym identity. The UE uses its fast re-authentication identity in the EAP-Response/Identity packet.

At step 306, if the AAA server 140 recognizes the identity as a valid fast re-authentication identity, and if the AAA server 140 agrees to use fast re-authentication, then the AAA server 140 sends the EAP-Request/AKA re-authentication packet to the user equipment (UE). This packet must include the encrypted AT_COUNTER attribute, with a fresh counter value, the encrypted AT_NONCE_S attribute that contains a random number chosen by the AAA server 140, the AT_ENCR_DATA and the AT_IV attributes used for encryption, and the AT_MAC attribute that contains a message authentication code over the packet. The packet may also include an encrypted AT_NEXT_REAUTH_ID attribute that contains the next fast re-authentication identity. Fast re-authentication identities are one-time identities. If the UE does not receive a new fast re-authentication identity, it must use either the permanent identity or a pseudonym identity on the next authentication to initiate full authentication.

At step 308, the user equipment (UE) verifies that AT_MAC is correct and that the counter value is fresh (greater than any previously used value). The subscriber may save the next fast re-authentication identity from the encrypted AT_NEXT_REAUTH_ID for next time.

At step 310, if all checks are successful, the user equipment (UE) responds with the EAP-Response/AKA-Re-authentication packet, including the AT_COUNTER attribute with the same counter value and the AT_MAC attribute.

At step 312, the AAA server 140 verifies the AT_MAC attribute and also verifies that the counter value is the same that it used in the EAP-Request/AKA-Re-authentication packet.

At step 314, if these checks are successful, the fast re-authentication has succeeded and the server sends the EAP-Success packet to the user equipment (UE).

Figure 4:
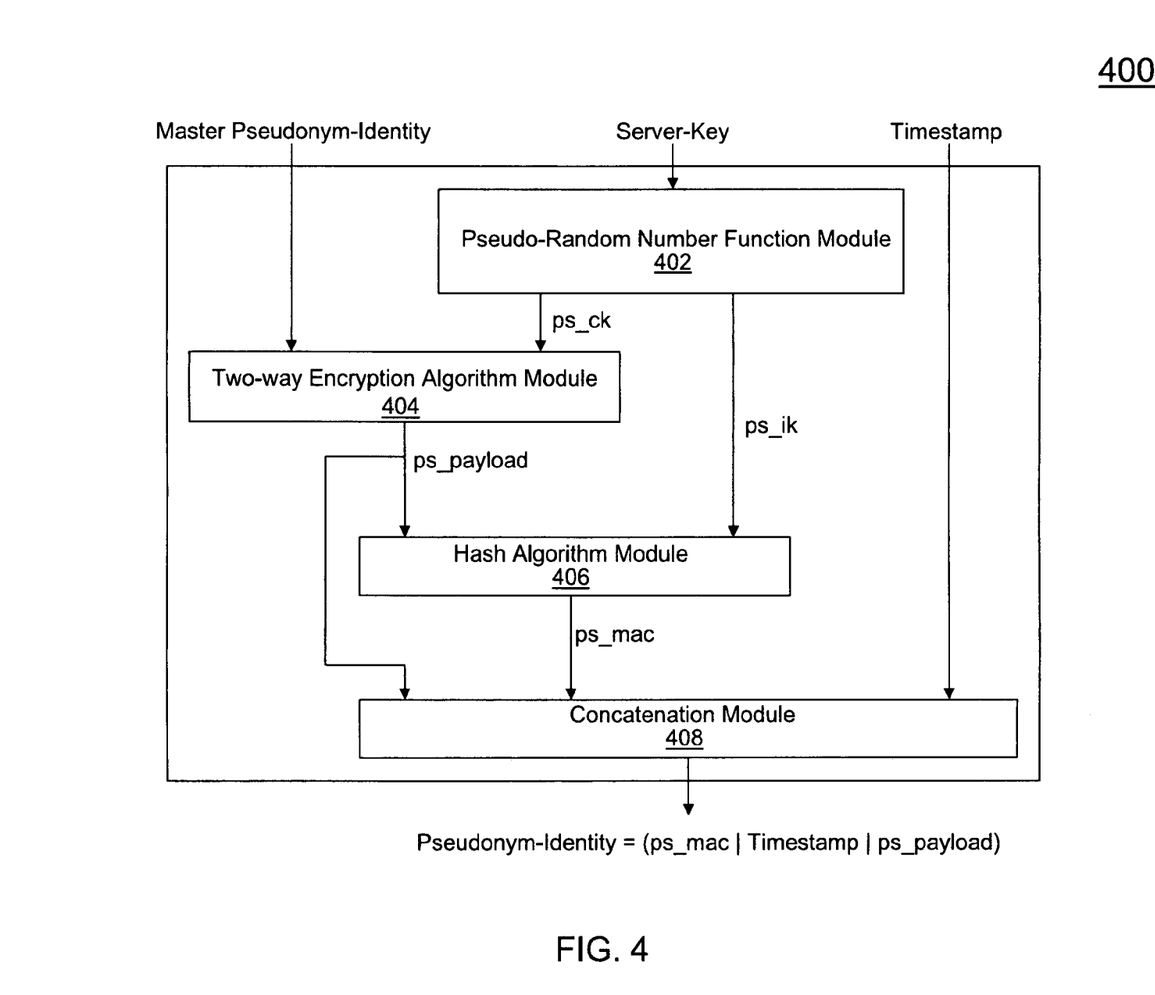
FIG. 4 illustrates an exemplary embodiment of a pseudonym identity generation module.

FIG. 4 illustrates an exemplary embodiment of a pseudonym identity generation module of the current invention. Pseudonym identity generation module 400 is operable to create a pseudonym identifier for use in a successful full authentication exchange in EAP-AKA, according to an exemplary embodiment of the present invention. Pseudonym identity generation module 400 can be located within an AAA server. Pseudonym identity generation module 400 may be implemented using a combination of hardware and software.

Pseudonym identity generation module 400 typically creates a pseudonym identity after a successful authentication based on the IMSI. An AAA server 140 may then return the pseudonym identity to a NAS 130.

Pseudonym identity generation module 400 derives a pseudonym identity from a subscriber's master pseudonym identifier and a current server key. A server-key may be known by all AAA servers within a given failover group and may be used by cryptographic algorithms presented herein. To ensure security, the server-key should be rotated at the same frequency as the pseudonym identity regeneration rate chosen by the network operator. One way to accomplish this is to attach timestamps to each server-key and ensure that the AAA servers are time synchronized (e.g., via Network Time Protocol (NTP)). The server-key should be distributed in a secure method as would be understood by one of ordinary skill in the art. In an exemplary embodiment present herein, the server-key is a random string of at least 160 bits. In an exemplary embodiment, the master pseudonym is assumed to be a random string of 128 bits in length and is not derived from the subscriber's permanent identity (IMSI).

Pseudonym identity generation module 400 comprises pseudo-random number function module 402, two-way encryption algorithm module 404, hash algorithm module 406, and concatenation module 408.

Pseudo-random number function module 402 is a module that generates a pseudo-random number. In an exemplary embodiment, pseudo-random number function module 402 accepts a 160-bit server key and generates a 128-bit pseudo-random number. The first 64 bits of the 128-bit pseudo-random number are represented in FIG. 4 by ps_ck and the next 64 bits of the 128-bit pseudo-random number are represented by ps_ik.

Two-way encryption algorithm module 404 is a module that performs a 2-way encryption algorithm. For example, two-way encryption algorithm module 404 can use the XOR (exclusive or) salted MD5 (Message-Digest Algorithm 5) encryption algorithm. In an exemplary embodiment, two-way encryption algorithm module 404 accepts a Master-Pseudo-ID in plain text and the ps_ck, and outputs a 128-bit ps_payload.

Hash algorithm module 406 accepts the 128-bit ps_payload and the 64-bit ps_ik and executes a hash algorithm with these two string values. In an exemplary embodiment, hash algorithm module 406 performs a SHA-1 hash function, thereby producing a 160-bit bit string, ps_mac.

Concatenation module 408 accepts the ps_payload, ps_mac, and the timestamp associated with the server-key and concatenates them to form the pseudonym identity. This resulting pseudonym identity is a binary string that can be converted to a printable string using Base64/Radix64 for use in the Network Access Identifier (NAI).

The generation of a pseudonym identity from a server-key and a master pseudonym identity can be summarized as follows.

ps_mk=prf(server-key);
ps_ck=first 64 bits of ps_mk;
ps_ik=next 64 bits of ps_mk;
ps_payload=enc_fn(Master-Pseudo-Id, ps_ck);
ps_mac=mac(ps_payload|ps_ik);
Pseudo-Id=ps_mac|timestamp|ps_payload;

where prf(<seed>) is a pseudo-random number function (PRF), enc_fn(<plaintext>,<encryption-key>) is any 2-way encryption algorithm, and mac(<payload>,<integity-key>) is a hash algorithm.

Figure 5:
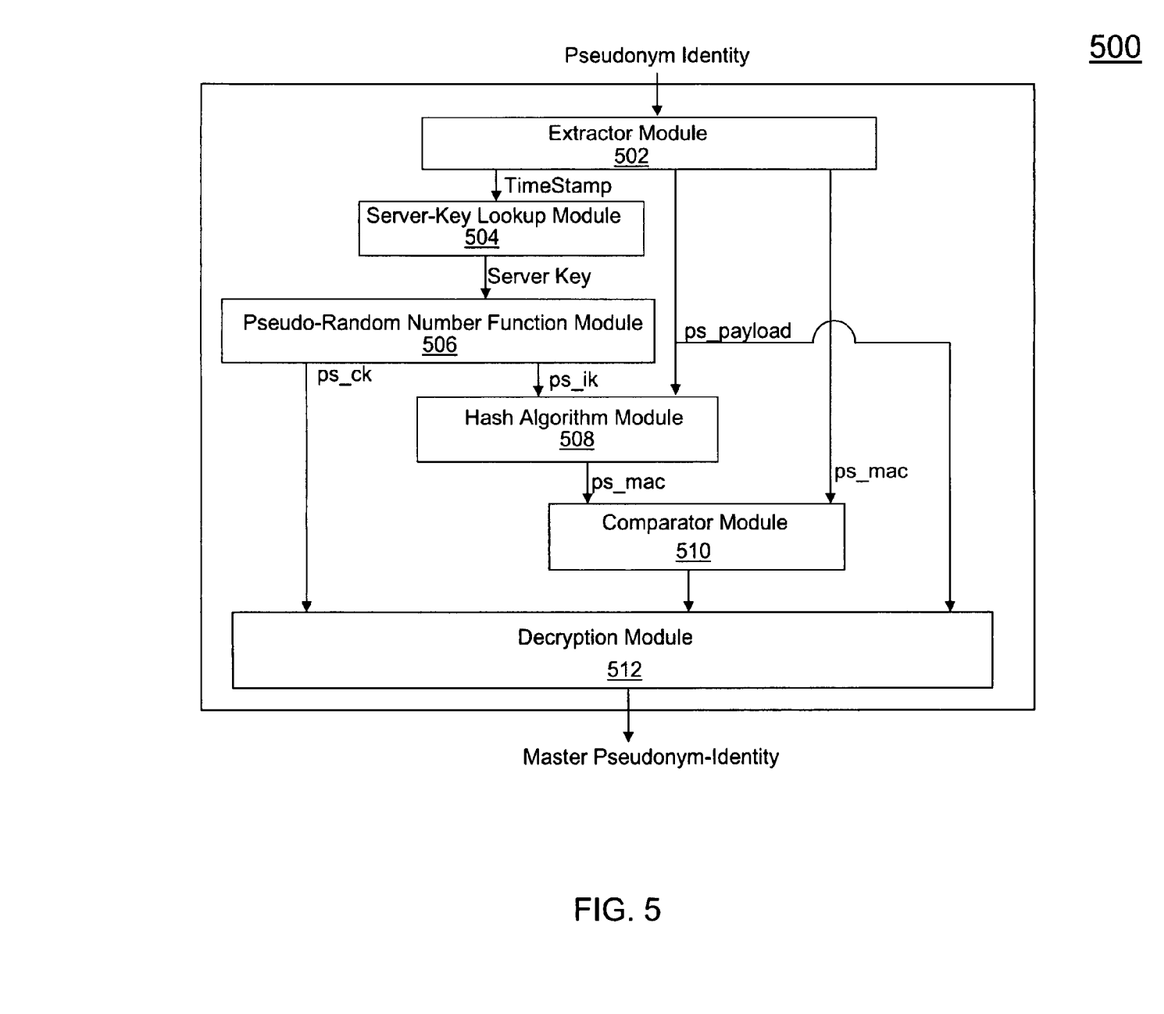
FIG. 5 illustrates an exemplary embodiment of a pseudonym identity validation module.

FIG. 5 illustrates an exemplary embodiment of a pseudonym identity validation module. Pseudonym identity validation module 500 is operable to validate a pseudonym identity created by a pseudonym identity generation module 400. A pseudonym identity validation module 500 can be located in an AAA server and can be implemented in hardware and software. The pseudonym identity validation module 500 can be located in the same AAA server that generated the pseudonym identity or a different AAA server (e.g., a backup AAA server). Pseudonym identity module 500 comprises extractor module 502, server-key lookup module 504, pseudo-random number function module 506, hash algorithm module 508, comparator module 510, and decryption module 512.

Extractor module 502 receives a pseudonym identity created by the process described in accordance with FIG. 4 and extracts the timestamp, ps_payload and ps_mac.

Server-key lookup module 504 is a table listing of the active server keys for given time periods. When server-key lookup module 504 receives a timestamp, it determines which past server-key corresponds to the timestamp. Server-key lookup module 504 outputs the server-key to the pseudo-random number function module 506.

Pseudo-random number function module 506 is a pseudo-random number function module that uses the same pseudo-random number function as pseudo-random number function module 402. Thus, for a given 160-bit server key, pseudo-random number function module 506 will generate the same ps_ck and ps_ik as was generated by pseudo-random number function module 402.

Hash algorithm module 508 is a hash algorithm that uses the same hash algorithm as hash algorithm module 406. Thus, for a given 128-bit ps_payload and 64-bit ps_ik, hash algorithm module 508 will generate the same ps_mac as was generated by hash algorithm module 406.

Comparator module 510 compares the ps_mac extracted from the received pseudonym identity and the ps_mac generated from hash algorithm module 508. If the two do not match, the pseudonym identity is assumed to be invalid and is rejected. If the two ps_mac's match, the pseudonym identity is assumed to be valid and decryption module 512 uses the ps_payload and the ps_ck to determine the master pseudonym identity.

After the master pseudonym identity is validated, the AAA server containing the pseudonym identity validation module 500 uses the master pseudonym identity to retrieve the permanent identity (IMSI) from the subscriber database according to a full authentication exchange in EAP-AKA.

The validation of a received pseudonym identity can be summarized as follows.

Extract the timestamp, ps_payload and rcvd_mac from the received Pseudonym-Identity;

Look-up the server-key from a look-up table using the timestamp;

ps_mk=prf(server-key);
ps_ck=first 64 bits of ps_mk;
ps_ik=next 64 bits of ps_mk;
ps_mac=mac(ps_payload|ps_ik);

if ps_mac and rcvd_mac match, decrypt the ps_payload using the ps_ck to determine the Master-Pseudo-Id;

if ps_mac and rcvd_mac do not match, the received Pseudonym-Identity is assumed to be invalid and rejected;

where prf(<seed>) is a pseudo-random number function (PRF), decrypt is a decryption algorithm, and mac(<payload>,<integrity-key>) is a hash algorithm.

Figure 6:
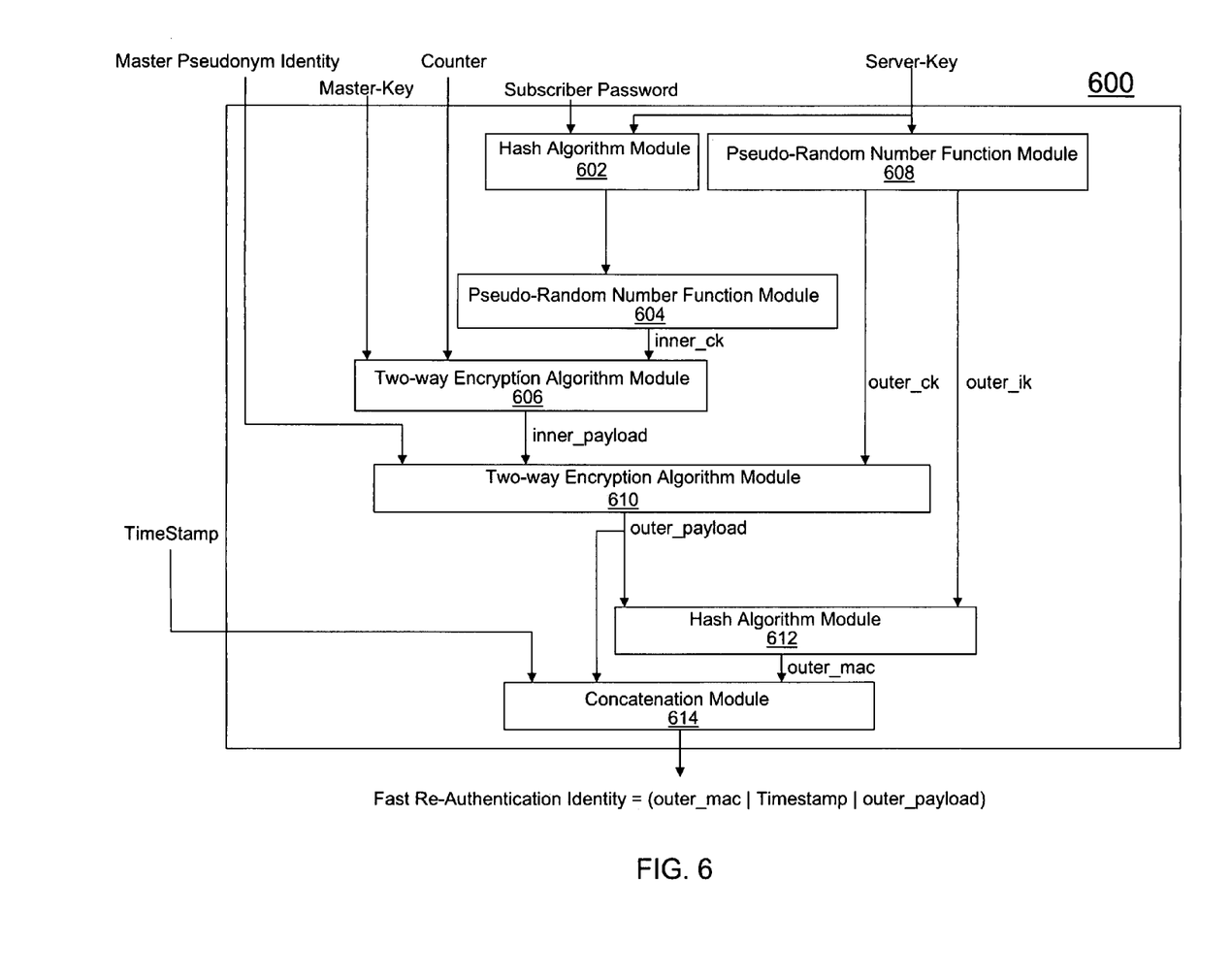
FIG. 6 illustrates an exemplary embodiment of a Fast Re-authentication identity generation module.

FIG. 6 illustrates an exemplary embodiment of a fast re-authentication identity generation module. Fast re-authentication identity generation module 600 is operable to create a fast re-authentication identity for use in a successful fast re-authentication exchange in EAP-AKA, according to an exemplary embodiment of the present invention. Fast re-authentication identity generation module 600 can be located within an AAA server. Fast re-authentication identity generation module 600 may be implemented using a combination of hardware and software.

Fast re-authentication identity generation module 600 uses a master pseudonym identity generated by pseudonym identity generation module 400, the subscriber's password, the master key, the current server-key, a counter value, and a timestamp value to generate a fast re-authentication identity. In an exemplary embodiment, the subscriber password is assumed to be a random string of 128 bits in length such that it is not susceptible to a dictionary attack.

Fast re-authentication identifier generation module 600 comprises hash algorithm module 602, pseudo-random number function module 604, pseudo-random number function module 608, two-way encryption algorithm module 606, two-way encryption algorithm module 610, hash algorithm module 612, and concatenation module 614.

Hash algorithm module 602 accepts the server-key and a subscriber password and executes a hash algorithm with the server key and the password. In an exemplary embodiment, hash algorithm module 602 performs a SHA-1 hash function, thereby producing a 160-bit string.

Pseudo-random number function module 604 is a module that generates a pseudo-random number. In an exemplary embodiment, pseudo-random number function module 604 accepts the 160-bit string from hash algorithm module 602 and generates a 128-bit pseudo-random number. The 128-bit pseudo-random number is represented in FIG. 6 by inner_mk.

Two-way encryption algorithm module 606 is a module that performs a 2-way encryption algorithm. For example, two-way encryption algorithm module 606 can use a XOR salted MD5 encryption algorithm. In an exemplary embodiment, two-way encryption algorithm module 606 accepts the master key, a counter value and inner_ck, and outputs a 128-bit inner_payload.

Pseudo-random number function module 608 is a module that generates a pseudo-random number. In an exemplary embodiment, pseudo-random number function module 608 accepts a 160-bit server key and generates a 128-bit pseudo-random number. The first 64 bits of the 128-bit pseudo-random number are represented in FIG. 6 by outer_ck and the next 64 bits of the 128-bit pseudo-random number are represented by outer_ik.

Two-way encryption algorithm module 610 is a module that performs a 2-way encryption algorithm. For example, encryption algorithm module 610 can use a XOR salted MD5 encryption algorithm. In an exemplary embodiment, two-way encryption algorithm module 606 accepts the master pseudonym identity, inner_payload and outer_ck, and outputs a 128-bit outer_payload.

Hash algorithm module 612 accepts the outer_payload and the outer_ik, and executes a hash algorithm with the two string values. In an exemplary embodiment, hash algorithm module 612 performs a SHA-1 hash function, thereby producing a 160-bit string, outer_mac.

Concatenation module 614 accepts the outer_payload, outer_mac, and the timestamp associated with the server-key, and concatenates them to form the fast re-authentication identity.

The generation of a fast re-authentication identity from the master-key, a master pseudonym identity, a subscriber password and a current server-key can be summarized as follows:

inner_mk=prf(mac(server-key|subscriber-password));
inner_ck=first 128 bits of inner_mk;
inner_payload=enc_fn(master-key|counter, inner_ck);
outer_mk=prf(server-key);
outer_ck=first 64 bits of outer_mk;
outer_ik=next 64 bits of outer_mk;
outer_payload=enc_fn(Master-Pseudo-Id|inner_payload, outer_ck);
outer_mac=mac(outer_payload|outer_ik);
Fast-Reauth-Id=outer_mac|timestamp|outer_payload;

where prf(<seed>) is a pseudo-random number function (PRF), enc_fn(<plaintext>,<encryption-key>) is a 2-way encryption algorithm, and mac(<payload>,<integity-key>) is a hash algorithm. It should be noted that the two instances of the prf function in the above process need not be the same function, although in a specific embodiment the same function can be used. Similarly, it should be noted that the two instances of the enc_fn function in the above process need not be the same function, although in a specific embodiment the same function can be used. Also, it should be noted that the two instances of the mac function in the above process need not be the same function, although in a specific embodiment the same function can be used.

Figure 7:
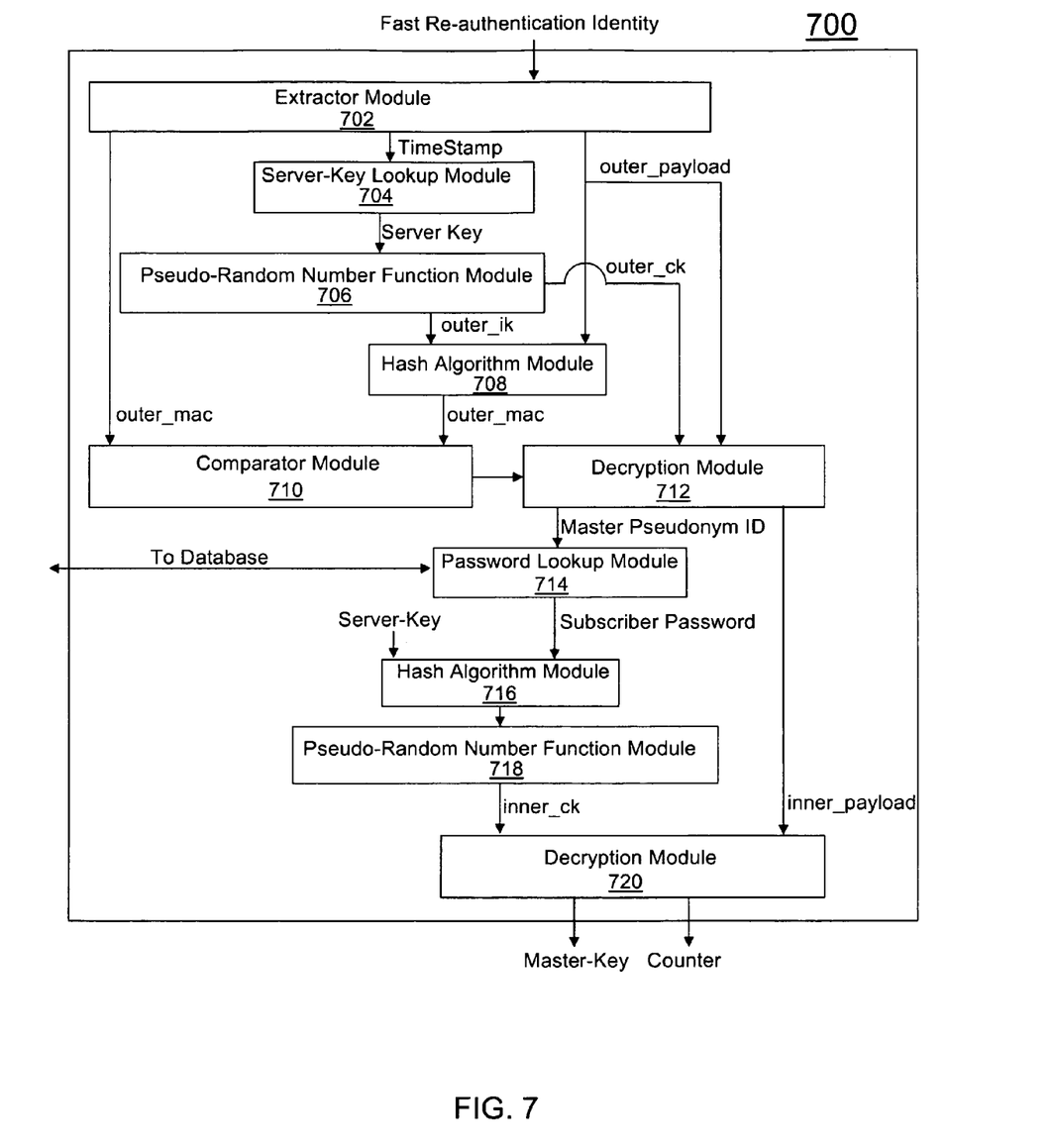
FIG. 7 illustrates an exemplary embodiment of a Fast Re-authentication identity validation module.

FIG. 7 illustrates an exemplary embodiment of a fast re-authentication identity validation module. Fast re-authentication identity validation module 700 is operable to validate a fast re-authentication identity created by fast re-authentication identity generation module 600. A fast re-authentication identity validation module 700 can be located in an AAA server and can be implemented in hardware and software. The fast re-authentication identity validation module 700 can be located in the same AAA server that generated the fast re-authentication identity or a different AAA server (e.g., a backup AAA server). Fast re-authentication identity module 700 comprises extractor module 702, server-key lookup module 704, pseudo-random number function module 706, hash algorithm module 708, comparator module 710, decryption module 712, password lookup module 714, hash algorithm module 716, pseudo-random number function module 718, and decryption module 720.

Extractor module 702 receives a fast re-authentication identity created by the process described in accordance with FIG. 6, and extracts the timestamp, outer_payload and outer_mac.

Server-key lookup module 704 is a table listing of the active server keys for given time periods. When server-key lookup module 704 receives a timestamp, it determines which past server-key corresponds to the timestamp. Server-key lookup module 704 outputs the server-key to the pseudo-random number function module 706.

Pseudo-random number function module 706 is a pseudo-random number function module that uses the same pseudo-random number function as pseudo-random number function module 608. Thus, for a given 160-bit server key, pseudo-random number function module 706 will generate the same outer_ck and outer_ik as generated by pseudo-random number function module 608.

Hash algorithm module 708 is a hash algorithm that uses the same hash algorithm as hash algorithm module 612. Thus, for a given outer_payload and outer_ik, hash algorithm module 708 will generate the same outer_mac as generated by hash algorithm module 612.

Comparator module 710 compares the outer_mac extracted from the received fast re-authentication identity and the outer_mac generated from hash algorithm module 708. If the two do not match, the fast re-authentication identity is assumed to be invalid and is rejected. If the two outer_mac's match, the fast re-authentication identity is assumed to be valid and decryption module 712 uses the outer_payload and the outer_ck to determine the master pseudonym identity and the inner_payload.

Password lookup module 714 accepts a master pseudonym identity from the decryption module 712 and uses the master pseudonym identity to retrieve the subscriber's password from the subscriber database.

Hash algorithm module 716 is a hash algorithm that uses the same hash algorithm as hash algorithm module 602. Thus, for a given subscriber password and server-key, hash algorithm module 716 will generate the same value as generated by hash algorithm module 602.

Pseudo-random number function module 718 is a pseudo-random number function module that uses the same pseudo-random number function as pseudo-random number function module 604. Thus, for a given input value, pseudo-random number function module 718 will generate the same inner_mk as generated by pseudo-random number function module 604.

Decryption module 720 accepts the inner_ck and the inner_payload. From the inner_mk and the inner_payload, decryption module is able to determine the master key and the counter value. The master key and counter value are used for the generation of K_encr, K_aut and for the regeneration of the MSK.

The validation of a received fast re-authentication identity can be summarized as follows:

Extract the timestamp, outer_payload and rcvd_mac from the received Fast Re-authorization-Identity;

Look-up the server-key from a look-up table using the timestamp;

outer_mk=prf(server-key);
outer_ck=first 64 bits of outer_mk;
outer_ik=next 64 bits of outer_mk;
outer_mac=mac(outer_payload|outer_ik);
if outer_mac and rcvd_mac do not match, the Fast Re-authorization-Identity is assumed to be invalid and rejected;

if outer_mac and rcvd_mac match, decrypt the outer_payload using outer_ck to derive the Master-Pseudo-Id and the inner payload;

retrieve subscriber's password from a subscriber database using Master-Pseudo-Id;

inner_mk=prf(mac(server-key|subscriber-password));
inner_ck=first 128 bits of inner_mk;

decrypt inner_payload using inner_ck to determine master-key (MK) and counter;

regenerate master session key (MSK) and generate K_encr and K_aut, using master-key (MK) and counter;

where prf(<seed>) is a pseudo-random number function (PRF), decrypt is a decryption algorithm, and mac(<payload>,<integrity-key>) is a hash algorithm. It should be noted that the two instances of the prf function in the above process need not be the same function, although in a specific embodiment the same function can be used. Similarly, it should be noted that the two instances of the decrypt function in the above process need not be the same function, although in a specific embodiment the same function can be used. Also, it should be noted that the two instances of the mac function in the above process need not be the same function, although in a specific embodiment the same function can be used.

As noted earlier, persons skilled in the art will recognize that the fast re-authentication algorithms employed in EAP-SIM are sufficiently similar to those algorithms employed in EAP-AKA such that embodiments of the current invention directed towards EAP-SIM also fall within the scope of the current invention.

Computer System Implementation

Figure 8:
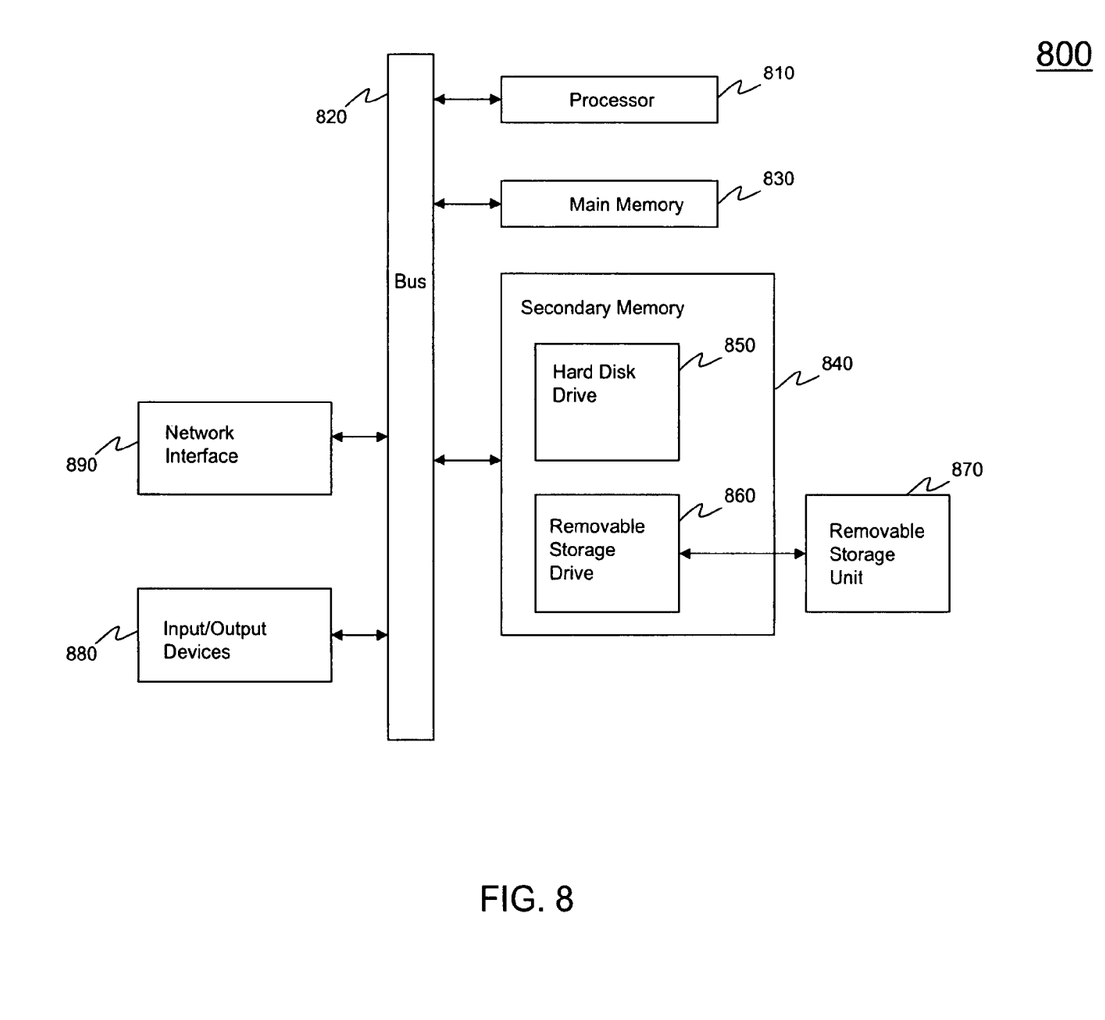
FIG. 8 provides a diagram of a computer system on which the methods and systems herein described can be implemented, according to an embodiment of the invention.

In an embodiment of the present invention, the methods and systems of the present invention described herein are implemented using well known computers, such as a computer 800 shown in FIG. 8. The computer 800 can be any commercially available and well known computer or server capable of performing the functions described herein, such as computers available from International Business Machines, Apple, Sun, HP, Dell, etc.

Computer 800 includes one or more processors (also called central processing units, or CPUs), such as processor 810. Processor 800 is connected to communication bus 820. Computer 800 also includes a main or primary memory 830, preferably random access memory (RAM). Primary memory 830 has stored therein control logic (computer software), and data.

Computer 800 may also include one or more secondary storage devices 840. Secondary storage devices 840 include, for example, hard disk drive 850 and/or removable storage device or drive 860. Removable storage drive 860 represents a floppy disk drive, a magnetic tape drive, a compact disk drive, an optical storage device, tape backup, ZIP drive, JAZZ drive, etc.

Removable storage drive 860 interacts with removable storage unit 870. As will be appreciated, removable storage unit 860 includes a computer usable or readable storage medium having stored therein computer software (control logic) and/or data. Removable storage drive 860 reads from and/or writes to the removable storage unit 870 in a well known manner.

Removable storage unit 870, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 800, or multiple computer 800s to perform any combination of the functions described herein Computer programs (also called computer control logic) are stored in main memory 830 and/or the secondary storage devices 840. Such computer programs, when executed, direct computer 800 to perform the functions of the present invention as discussed herein. In particular, the computer programs, when executed, enable processor 810 to perform the functions of the present invention. Accordingly, such computer programs represent controllers of the computer 800.

Computer 800 also includes input/output/display devices 880, such as monitors, keyboards, pointing devices, etc.

Computer 800 further includes a communication or network interface 890. Network interface 890 enables computer 800 to communicate with remote devices. For example, network interface 890 allows computer 800 to communicate over communication networks, such as LANs, WANs, the Internet, etc. Network interface 890 may interface with remote sites or networks via wired or wireless connections. Computer 800 receives data and/or computer programs via network interface 890. The electrical/magnetic signals having contained therein data and/or computer programs received or transmitted by the computer 800 via interface 890 also represent computer program product(s).

The invention can work with software, hardware, and operating system implementations other than those described herein. Any software, hardware, and operating system implementations suitable for performing the functions described herein can be used.

Conclusion

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. Thus, the breadth and scope of the present invention should not be limited by any of the above-described exemplary embodiments, but should be defined only in accordance with the following claims and their equivalents.

What is claimed is:

1. A method for generating a temporary pseudonym identity associated with a subscriber, comprising:
    generating a master pseudonym identity associated with the subscriber, wherein the master pseudonym identity is derived from a source other than a subscriber's permanent identity;
    generating a ps_mk by applying a pseudo-random number function to a server-key, wherein a timestamp is associated with the server key;
    partitioning a ps_mk into a plurality of portions including at least a ps_ck portion and a ps_ik portion;
    generating a ps_payload by applying a two-way encryption function to the master pseudonym identity and the ps_ck;
    generating a ps_mac by applying a hashing function to a concatenation of the ps_payload and the ps_ik; and
    generating a temporary pseudonym identity by concatenating the ps_mac, the timestamp, and the ps_payload.

2. The method of claim 1, wherein the ps_ck is the first 64 bits of the ps_mk, and the ps_ik is the next 64 bits of the ps_mk.

3. The method of claim 1, wherein the hashing function is the SHA-1 algorithm.

4. The method of claim 1, wherein the two-way encryption function is the exclusive or (XOR) salted MD5 encryption algorithm.

5. A method for generating a fast re-authentication identity storing session state key information for use in an EAP-AKA fast re-authentication, comprising:
    generating a first digital value by applying a first hashing function to a concatenation of a server-key and a subscriber password, wherein a timestamp is associated with the server key;
    generating an inner_mk by applying a first pseudo-random number function to the first digital value;
    generating an inner_ck by extracting a first 128 bits of inner_mk;
    generating an inner_payload by applying a first two-way encryption function to the inner_ck and a concatenation of a master key and a counter;
    generating an outer_mk by applying a second pseudo-random number function to the server key;
    partitioning the outer_mk into a plurality of portions including at least an outer_ck portion and an outer_ik portion;
    generating an outer_payload by applying a second two-way encryption function to the outer_ck and a concatenation of the inner_payload and a Master Pseudo Id;
    generating an outer_mac by applying a second hashing function to a concatenation of the outer_payload and the outer_ik; and
    generating a fast re-authentication identity storing session state key information by concatenating the outer_mac, the timestamp, and the outer_payload.

6. The method of claim 5, wherein the outer_ck is the first 64 bits of the outer_mk, and the outer_ik is the next 64 bits of the outer_mk.

7. The method of claim 5, wherein the first and second hashing functions are the SHA-1 algorithm.

8. The method of claim 5, wherein the first and the second two-way encryption functions are the exclusive or (XOR) salted MD5 encryption algorithm.

9. A method for validating a pseudonym identity associated with a subscriber, comprising:
    receiving a pseudonym identity associated with the subscriber, wherein the master pseudonym identity is derived from a source other than a subscriber's permanent identity;
    extracting a timestamp, a ps_payload and a rcvd_mac from the received pseudonym identity;
    determining a server key using a look-up table and the timestamp;
    generating a ps_mk by applying a pseudo-random number function to the server-key;
    partitioning the ps_mk into a plurality of portions including at least a ps_ck portion and a ps_ik portion;

generating a ps_mac by applying a hashing function to a concatenation of the ps_payload and the ps_ik;

comparing the ps_mac and the rcvd_mac; and if comparing reveals a match, determining a Master-Pseudo-Id by applying a decryption function to the ps_payload and the ps_ck.

10. The method of claim 9, wherein the ps_ck is the first 64 bits of the ps_mk, and the ps_ik is the next 64 bits of the ps_mk.

11. The method of claim 9, wherein the hash function is the SHA-1 algorithm.

12. The method of claim 9, wherein the decryption function is associated with the exclusive or (XOR) salted MD5 encryption algorithm.

13. A method for validating a fast re-authentication identity storing session state key information for a subscriber for use in an EAP-AKA fast re-authentication, comprising:

receiving a fast re-authentication identity storing session state key information associated with the subscriber;

extracting a timestamp, an outer_payload and a rcvd_mac from the received fast re-authentication identity;

determining a server key using a look-up table and the timestamp;

generating an outer_mk by applying a first pseudo-random number function to the server-key;

partitioning the outer_mk into a plurality of portions including at least an outer_ck portion and an outer_ik portion;

generating a outer_mac by applying a first hashing function to a concatenation of the outer_payload and the outer_ik;

comparing the outer_mac and the rcvd_mac; and if comparing does not reveal a match, rejecting the received fast re-authentication identity and stop;

if comparing does reveal a match, determining a Master-Pseudo-Id and an inner_payload by applying a first decryption function to the outer-payload using the outer_ck;

retrieving a subscriber password from a subscriber database using the Master-Pseudo-Id;

generating an inner_mk by applying a second pseudo-random number function to an output of applying a second hashing function to a concatenation of the server-key and the subscriber password;

extracting an inner_ck, wherein the inner_ck is a first 128 bits of the inner_mk;

determining a master-key (MK) from which all other key material is derived and a counter by applying a second decryption function to the inner-payload using the inner_ck; and regenerating master session key (MSK) for use in fast re-authentication using the master-key (MK) and the counter.

14. The method of claim 13, wherein the outer_ck is the first 64 bits of the outer_mk, and the outer_ik is the next 64 bits of the outer_mk.

15. The method of claim 13, wherein the first and second hashing functions are the SHA-1 algorithm.

16. The method of claim 13, wherein the first and second decryption algorithms are associated with the exclusive or (XOR) salted MD5 encryption algorithm.

* * * * *